United States Patent
Nappo et al.

(10) Patent No.: US 9,789,881 B2
(45) Date of Patent: Oct. 17, 2017

(54) OPTIMIZED CONTROL OF THE OPERATION OF ONE OR MORE TRACTION SYSTEMS OF A TRAIN FOR ENTERING AND EXITING FROM A COASTING CONDITION

(71) Applicant: ANSALDOBREDA S.p.A., Naples (IT)

(72) Inventors: Ciro Nappo, Naples (IT); Luigi Accardo, Naples (IT); Vincenzo Mungiguerra, Naples (IT); Fabio Voccia, Naples (IT); Guglielmo Navarra, Naples (IT)

(73) Assignee: Ansaldobreda S.P.A., Napoli (IT)

( * ) Notice: Subject to any disclaimer, the term of this patent is extended or adjusted under 35 U.S.C. 154(b) by 39 days.

(21) Appl. No.: 14/418,181

(22) PCT Filed: Jul. 30, 2013

(86) PCT No.: PCT/IB2013/056261
§ 371 (c)(1),
(2) Date: Jan. 29, 2015

(87) PCT Pub. No.: WO2014/020542
PCT Pub. Date: Feb. 6, 2014

(65) Prior Publication Data
US 2015/0158502 A1 Jun. 11, 2015

(30) Foreign Application Priority Data

Jul. 30, 2012 (IT) .............................. TO2012A0674

(51) Int. Cl.
*B61C 11/00* (2006.01)
*B60L 15/02* (2006.01)
(Continued)

(52) U.S. Cl.
CPC ............ *B61C 11/00* (2013.01); *B60L 15/025* (2013.01); *B61C 13/00* (2013.01);
(Continued)

(58) Field of Classification Search
CPC ....... B61C 11/00; B61C 13/00; B60L 15/025; B60L 2260/24; H02P 21/0089
See application file for complete search history.

(56) References Cited

U.S. PATENT DOCUMENTS

2006/0266256 A1* 11/2006 Donnelly .................. B60L 7/06
105/61
2007/0138995 A1* 6/2007 Chanal ...................... B60L 9/22
318/800
(Continued)

FOREIGN PATENT DOCUMENTS

EP 2048772 A1 4/2009
EP 2 192 684 A1 6/2010
(Continued)

OTHER PUBLICATIONS

International Search Report and Written Opinion prepared by the European Patent Office on Mar. 28, 2014, for International Application No. PCT/IB2013/056261.

*Primary Examiner* — Jelani Smith
*Assistant Examiner* — Jordan S Fei
(74) *Attorney, Agent, or Firm* — Sheridan Ross PC

(57) ABSTRACT

A railway vehicle comprises a traction system including an asynchronous electric motor or a synchronous electric DC motor operable by an inverter electronic drive system. The vehicle further comprises an electronic control unit coupled to the traction system and configured to receive signals/data/commands indicative of operating conditions of the vehicle and of the traction system and to determine, based on the received signals/data/commands, the occurrence of a coasting condition of the vehicle and the occurrence of an exit
(Continued)

condition from the coasting condition of the vehicle. If a coasting condition of the vehicle occurs, the electronic drive system is controlled to cause the electric motor to undergo magnetic flux changes. If an exit condition from the coasting condition occurs, and depending whether the electronic drive system is on or off, the electronic drive system is controlled to increase torque of the electric motor or to reduce magnetic flux reduction.

3 Claims, 7 Drawing Sheets

(51) Int. Cl.
  *H02P 21/00* (2016.01)
  *B61C 13/00* (2006.01)
(52) U.S. Cl.
  CPC ....... *H02P 21/0089* (2013.01); *B60L 2200/26* (2013.01); *B60L 2260/24* (2013.01); *B60L 2260/26* (2013.01); *Y02T 10/643* (2013.01)

(56) References Cited

U.S. PATENT DOCUMENTS

| | | | |
|---|---|---|---|
| 2011/0130903 A1* | 6/2011 | Heisel | B60K 6/48 701/22 |
| 2012/0181970 A1* | 7/2012 | Yuuki | H02K 1/2766 318/716 |

FOREIGN PATENT DOCUMENTS

| | | |
|---|---|---|
| EP | 2 322 374 A1 | 5/2011 |
| JP | 2001 103610 A | 4/2001 |

* cited by examiner

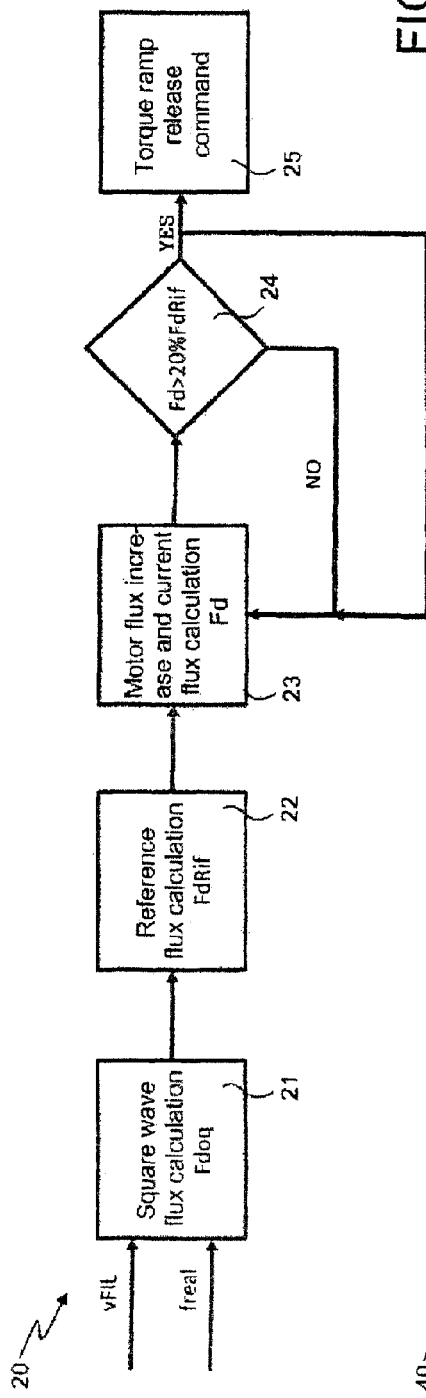
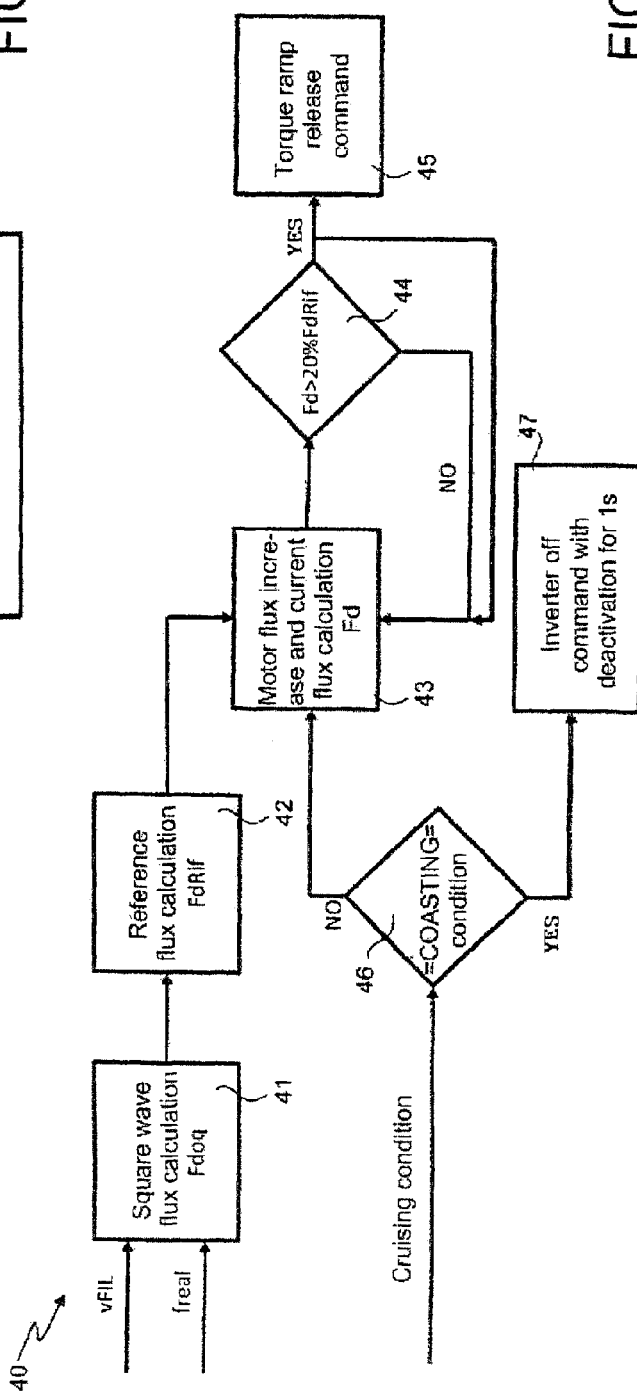

OPTIMIZED CONTROL OF THE OPERATION OF ONE OR MORE TRACTION SYSTEMS OF A TRAIN FOR ENTERING AND EXITING FROM A COASTING CONDITION

CROSS REFERENCE TO RELATED APPLICATIONS

This application is a national stage application under 35 U.S.C. 371 and claims the benefit of PCT Application No. PCT/IB2013/056261 having an international filing date of Jul. 30, 2013, which designated the United States, which PCT application claimed the benefit of Italian Patent Application No. TO2012A000674 filed Jul. 30, 2012, the disclosures of each of which are incorporated herein by reference in their entirety.

TECHNICAL FIELD OF THE INVENTION

The present invention relates to the control and management of the operation of one or more traction systems of a railway vehicle or train when a so-called freewheeling or coasting condition of said railway vehicle or train occurs, i.e. when the driving of the drive wheels of the railway vehicle or train by the traction system or systems is deactivated.

In particular, the present invention is advantageously, but not exclusively applied to the control and management of the operation of traction systems of railway vehicles or trains, which traction systems include asynchronous electric motors operated by inverter-type electronic drive systems, or electric Direct Current (DC) motors operated by chopper-type electronic drive systems.

With this regard, explicit reference will be made in the following description to the control and management of the operation of an inverter-type drive system used to operate an asynchronous electric motor used for traction of a railway vehicle without therefore loosing in generality, it being understood that the present invention may be equally used to control and manage the operation of a chopper-type drive system used for operating a synchronous electric DC motor (i.e., not of the permanent magnet type) used for the traction of a railway vehicle or, more in general, for the control and management of the operation of one or more traction systems based on electric motors not of the permanent magnet type of any type of railway vehicle or train.

Furthermore, it is worth noting that a specific aspect of the present invention may be advantageously exploited to control and manage the operation of a plurality of traction systems of any type of train, which traction systems may also be based on permanent magnet electric motors.

STATE OF THE ART

Control techniques of the magnetic flux of permanent magnet electric motors are known. For example, European patent application EP 2 048 772 A1 describes a system which includes: an electric motor based on a permanent magnet; an inverter for driving said electric motor; and magnetizing means for generating a magnetizing current for controlling the magnetic flux of the permanent magnet. Said permanent magnet is a variable flux magnet in which flux density varies as a function of a magnetizing current supplied by the inverter. The magnetizing means generate a magnetizing current which exceeds a magnetization saturation region of the magnetic material of the variable flux magnet in use. Said system according to EP 2 048 772 A1 allows to improve flux repeatability of the variable flux magnet and accuracy of the electric motor torque.

Furthermore, European patent application EP 2 192 684 A1 describes a system which includes: a variable magnetic flux electric motor having a variable flux electric motor, which is a low coercivity permanent magnet; an inverter which drives said variable magnetic flux electric motor; a magnetizing unit for generating a magnetizing current and controlling the magnetic flux of the variable flux magnet; and a boosting unit for increasing an input DC voltage to a predetermined target value and supplying it to the inverter. Said system according to EP 2 192 684 A1 allows to obtain a size reduction and high efficiency, ensuring the voltage needed to supply the magnetization current during the magnetic flux control of the variable flux magnet at the same time.

Furthermore, Japanese patent application JP 2001 103610 A describes techniques for managing and controlling the magnetic flux of a permanent magnet motor in a hybrid motor in order to limit the motor no-load voltage at high speed and the battery charge current.

As known, in the railway field, the energy consumption of a railway vehicle during normal operation is closely linked to the operative conditions of the main components, in particular of the traction system, the functions, features and performance of which closely depend on the respective control algorithms used.

Currently, during a phase of coasting of a train, the traction of which consists of an asynchronous electric motor operated by means of an inverter, said electric motor still undergoes a magnetic flux in all cases, with consequent losses, due to magnetizing current only, both in the inverter and in the motor itself.

Such losses increase as the speed increases to add up to nearly 50% of the losses which occur at full power for heavy traction vehicles.

FIG. 1 shows a functional block chart representing a typical architecture of a control unit (indicated as a whole by numeral 10) of the operation of an inverter used for operating an asynchronous electric motor used for the traction of a train.

In particular, as shown in FIG. 1, the control unit 10 is designed to receive input signals and/or data indicative of:

a filter voltage vFIL indicative of the input filter voltage;

a strain reference rateRefIn (conveniently generated by a train running master control unit, not shown in FIG. 1 for the sake of simplicity of the illustration);

a weight of the local bogie of the train loadX;

a weight of the non-motorized bogie of the train loadC;

an electric revolution frequency fmot of the rotor of the asynchronous electric motor;

an acceleration dfmot of the revolution frequency of the rotor of the asynchronous electric motor; and a train speed carSpeed (conveniently calculated by a train speed control unit, not shown in FIG. 1 for the sake of simplicity of the illustration).

Conveniently, the control unit 10 is connected to the multifunction vehicle bus (MVB) of the train to receive input signals and/or data indicative of the strain reference rateRefIn, of the weight of the local bogie loadX and of the weight of the non-motorized bogie loadC.

In particular, the control unit 10 shown in FIG. 1 includes a reference torque calculating module 11, which is designed to:

receive input signals and/or data indicative of the filter voltage vFIL, of the strain reference rateRefIn, of the weight of the local bogie loadX, of the weight of the non-motorized bogie loadC and of the revolution frequency fmot of the rotor of the asynchronous electric motor; and calculate a first torque reference value TorqueReq of the asynchronous electric motor on the basis of the received signals/data.

As known, the revolution frequency of the rotor axis of the electric motor is measured by means of appropriate speed sensors and the torque of the electric motor is maintained constant until a maximum power is reached. When the revolution frequency of the electric motor increases, torque decreases so as to maintain power constant. Therefore, power increases in linear manner to maximum power and then remains constant and in some cases is reduced at higher frequencies.

Furthermore, the control unit 10 also includes a slip or slide control module 12, which is designed to:

receive input signals and/or data indicative of the revolution frequency fmot of the asynchronous electric motor, of the acceleration of the revolution frequency dfmot of the asynchronous electric motor and of the train speed carSpeed;

receive signals and/or data indicative of the first reference value TorqueReq of the drive torque of the asynchronous electric motor from the reference torque calculating module 11; and calculate a second torque reference value TorqueAsk of the asynchronous electric motor on the basis of the received signals/data.

Furthermore, the control unit 10 also includes a reference flux calculating module 13, which is designed to:

receive input signals and/or data indicative of the filter voltage vFIL;

also receive input signals and/or data indicative of a supply frequency freal of the asynchronous electric motor; and calculate a reference value Fd of the magnetic flux of the asynchronous electric motor on the basis of the received signals/data.

In particular, the reference flux calculating module 13, in use, calculates a reference value for the magnetic flux of the rotor of the electric motor which is maintained until a maximum voltage value at the motor terminals is reached (six step mode or square wave mode). In detail, in the six step mode, the magnetic flux decreases as 1/freal, where freal is, as described above, the fundamental supply frequency of the motor. If the train starts from a standstill, the torque starts increasing when the magnetic flux value reaches 20% of a predetermined nominal value. Typically, 20% of the nominal magnetic flux value is reached in 100 ms.

Again with reference to FIG. 1, the control unit 10 also includes an inverter vector control module 14, which is designed to:

receive input signals and/or data indicative of the magnetic flux reference value Fd of the asynchronous electric motor and of the second drive torque reference value TorqueAsk of the asynchronous electric motor from the reference flux calculating module 13 and from the slip/slide control module 12, respectively; and calculate, on the basis of the received signals/data, a reference value of the direct component iDrif of the control current of the inverter, such that to cause the magnetic flux of the asynchronous electric motor to assume the aforesaid reference value Fd, a reference value of the quadrature component iQrif of the control current of the inverter, such that to cause the magnetic flux of the asynchronous electric motor to assume the aforesaid second reference value TorqueAsk, and a slip frequency fs needed to obtain the required torque.

As shown in FIG. 1, the supply frequency freal of the asynchronous motor is obtained by adding the slip frequency fs to the revolution frequency fmot of the rotor.

Furthermore, the control unit 10 also includes a current/voltage converter (I/V) 15, which is designed to:

receive input signals/data indicative of the reference values of the direct component iDrif and of the quadrature component iQrif of the control current of the inverter from the inverter vector control module 14;

also receive input signals and/or data indicative of the supply frequency freal; and calculate, on the basis of the received signals/data, a reference value of the direct component vD of the control voltage of the inverter, and a reference value of the quadrature component vQ of the control voltage of the inverter.

Again with reference to FIG. 1, the control unit 10 also includes a modulation value calculating module 16, which is designed to:

receive input signals and/or data indicative of the filter voltage vFIL;

receive input signals/data indicative of the reference value of the direct component vD and of the quadrature component vQ of the inverter control voltage from the I/V converter 15; and calculate, on the basis of the received signal/data, a value of the modulation index eta defined as the ratio between the root mean square (rms) of the inverter output voltage and the root mean square of the output voltage in six step mode for which eta is equal to one (i.e., eta=1); said ratio takes the filter voltage vFIL into account.

In particular, the value of the modulation index eta is calculated by the modulation value calculating module 16 in accordance with the following equation:

$$eta = \frac{\pi}{2} \cdot \frac{\sqrt{vD^2 + vQ^2}}{vFIL}.$$

Finally, the control unit 10 also includes a modulator 17, which is designed to:

receive input signals and/or data indicative of the supply frequency freal;

receiving the modulation index value eta from the modulation value calculating module 16; and generating, on the basis of the received signals/data, three phase commands phaseA, phaseB and phaseC to appropriately operate the inverter, i.e., such that to cause said inverter to operate the asynchronous three-phase electric motor so that the magnetic flux of said motor assumes the reference value Fd and the torque of said motor assumes the second reference value TorqueAsk.

Currently, in most cases, when the control unit 10 receives a coasting command from the train control and monitoring system, the strain curve is taken to zero following a ramp which limits the maximum jerk for passenger comfort, wherein the jerk is the derivative of acceleration. During this phase, the reference current decreases to the magnetizing current value only; at this point, the reference current remains constant until the control unit 10 receives another command from the train running master control unit. In other words, the inverter remains on as long as the coasting condition persists.

In particular, the operations described above are implemented by the control unit 10 by means of a suitable software logic. With this regard, FIG. 2 is a flow chart representing an example of inverter operation software control logic (indicated by reference numeral 20 as a whole) by means of which, also in presence of a train's coasting condition, the inverter remains always on.

In detail, as shown in FIG. 2, the control unit 10, by implementing the control logic 20, in use performs the following operations:

calculating a square wave magnetic flux value Fdoq of the asynchronous electric motor on the basis of the signals and/or data indicative of the filter voltage vFIL and of the supply frequency freal of the asynchronous motor (block 21);

calculating a magnetic flux reference target value FdRif of the asynchronous electric motor on the basis of the square wave magnetic flux value Fdoq and of a predetermined magnetic flux nominal value FdNom (block 22);

controlling the operation of the inverter so that the electric motor undergoes magnetic flux increase, i.e., so that the intensity of the magnetic flux increases, and at the same time calculating a current value Fd of the magnetic flux of the electric motor as a function of the reference target value FdRif (block 23);

checking whether the current magnetic flux value Fd is higher than 20% of the reference target value FdRif (block 24);

if the current value Fd of the magnetic flux is higher than 20% of the target reference value FdRif, generating a release command of the electric motor torque ramp (block 25), i.e. so that the motor torque starts increasing; whereas, if the current value Fd of the magnetic flux is not higher than 20% of the reference target value FdRif, continuing to control the operation of the inverter so that that the electric motor continues to undergo magnetic flux increase and continuing to calculate the current value Fd of the magnetic flux of the electric motor at the same time (block 23).

More in detail, the control unit 10 makes the flux reference target value FdRif assume (block 22):

the square wave flux value Fdoq, if the latter is lower than the nominal flux value FdNom (i.e., FdRif=Fdoq if Fdoq<FdNom); or the nominal value FdNom, if the square wave flux value Fdoq is higher than said nominal value FdNom (i.e., FdRif=FdNom if Fdoq>FdNom).

As mentioned above, by using the logic 20, the inverter remains on also in presence of a train's coasting condition. Therefore, by means of the control logic 20, the electric motor always undergoes a magnetic flux with consequent losses, due to the magnetizing current only, both in the inverter and in the motor itself.

With this regard, FIG. 3 shows a chart which was obtained by the Applicant by means of experimental tests and which shows the time trend of the characteristic magnitudes of an asynchronous electric motor of a train operated by means of an inverter controlled with the logic 20 as a coasting condition of the train occurs.

In particular, FIG. 3 shows the time trend:
of the current drawn from the line iLin;
of the filter voltage vFIL;
of the current drawn by the motor Imot;
of the train speed speed;
of the motor torque Torque; and
of the reference current IRif calculated by the control unit 10.

The chart in FIG. 3 shows how, during coasting of the train, the motor torque value Torque is zero, while the current drawn from the line iLin, the reference current value IRif and the motor current value Imot are not zero. In other words, with the control logic 20, the motor consumes energy even when it does not generate torque.

A more evolved control logic includes, during coasting, switching off the inverter and deactivating it for 1 second. With this regard, FIG. 4 is a flow chart showing an example of inverter operation software control logic (indicated by reference numeral 40 as a whole) by means of which the inverter is switched off and deactivated for 1 s, in presence of a train's coasting condition.

In particular, as shown in FIG. 4, by implementing the control logic 40, the control unit 10 in use performs all the operations of the previously described logic 20 (with this regard, it is worth noting that blocks 41, 42, 43, 44 and 45 of the logic 40 shown in FIG. 4 correspond to blocks 21-25 of the logic 20 shown in FIG. 2), which, therefore, will not be described again because the description above applies.

Furthermore, the control unit 10, by implementing the control logic 40, in use also performs the following operations:

checking, on the basis of the received commands/signals/data indicative of a current running condition of the train, whether the train is in a coasting condition (block 46);

if the train is not in a coasting condition, controlling the operation of the inverter so that the electric motor continues to undergo magnetic flux increase and calculating the current magnetic flux value Fd of the electric motor at the same time (block 43); whereas, if the train is in a coasting condition, generating an off command of the inverter and deactivating it for 1 s (block 47).

With this regard, FIG. 5 shows a chart which was obtained by the Applicant by means of experimental tests and shows the time trend of the characteristic magnitudes of an asynchronous electric motor of a train operated by means of an inverter controlled with the logic 40 as a coasting condition of the train occurs.

In particular, FIG. 5 shows the time trend:
of the current drawn from the line iLin;
of the motor current Imot;
of the train speed speed;
of the motor torque Torque; and
of the reference current IRif.

The chart in FIG. 5 shows how, during coasting of the train, the motor torque value Torque, the current drawn from the line iLin, the reference current value IRif and the motor current Imot are zero. In other words, with the control logic 40, the motor does not consume energy when it generates torque.

However, the control logic 40, although reducing the losses caused by the magnetizing current in the inverter and in the motor, displays the limitation of deactivating the inverter for 1 s. Such a limitation is very hard because it may cause a delay in motor operation. For example, mechanical braking must be used if the control unit 10 receives a braking command during the deactivation period of the inverter, i.e. the pneumatic or hydraulic braking system must be operated, which causes an increase of the stopping distance of the train and an anomalous consumption of the brake pads, as well as possible problems of comfort for passengers. Therefore, because of the aforesaid disadvantages, the control logic 40 is seldom used. In particular, the control logic 40 cannot be applied to trams and underground train vehicles precisely because of the aforesaid disadvantages.

OBJECT AND SUMMARY OF THE INVENTION

It is the object of the present invention to provide a control and management logic of the operation of an electronic drive system of an electric motor used for traction of a railway vehicle or train, which logic is capable of mitigating said disadvantages, at least in part.

In particular, a first object of the present invention is that of providing a control and management logic of the operation of an inverter- or chopper-type electronic drive system for an electric motor not of the permanent magnet type used for the traction of a railway vehicle, which logic allows to save energy during a phase of coasting (or freewheeling) of the railway vehicle.

Furthermore, a second object of the present invention is that of providing a control and management logic of the operation of a plurality of inverter- or chopper-type electronic drive systems for electric motors used for train traction, which logic allows to save energy during train cruising.

The aforesaid objects are reached by the present invention in that it relates to a railway vehicle and a train as defined in the appended claims.

In particular, a first aspect of the present invention concerns a railway vehicle comprising:

a traction system, which includes an electric motor operable by an electronic drive system; wherein the electric motor is an asynchronous motor and the electronic drive system is an inverter-type system, or the electric motor is a synchronous DC motor and the electronic drive system is a chopper-type system; and
an electronic control unit coupled to the traction system;
wherein the electronic control unit is configured to:
receive signals/data/commands indicative of operating conditions of the railway vehicle and of the traction system;
determine the occurrence of a coasting (or freewheeling) condition of the railway vehicle and the occurrence of an exit condition from the coasting (or freewheeling) condition of the railway vehicle, on the basis of the received signals/data/commands;
if the occurrence of a coasting condition of the railway vehicle is determined, control the operation of the electronic drive system so as to cause the electric motor to undergo a magnetic flux reduction and, during said magnetic flux reduction of the electric motor,
monitor the magnetic flux of the electric motor,
determine whether the magnetic flux of the electric motor decreases below a magnetic flux threshold, and,
if it is determined that the magnetic flux of the electric motor has decreased below said magnetic flux threshold, switch off the electronic drive system;
if the occurrence of an exit condition from the coasting condition of the railway vehicle is determined, determine whether the electronic drive system is on or off;
if the occurrence of an exit condition from the coasting condition of the railway vehicle is determined and it is also determined that the electronic drive system is on, cause the torque of the electric motor to start increasing;
if the occurrence of an exit condition from the coasting condition of the railway vehicle is determined and it is also determined that the electronic drive system is off, switch on the electronic drive system, control the operation of the electronic drive system so that the electric motor undergoes magnetic flux increase, and, during said magnetic flux increase of the electric motor,
monitor the magnetic flux of the electric motor,
determine whether the magnetic flux of the electric motor exceeds said magnetic flux threshold, and,
if it is determined that the magnetic flux of the electric motor has exceeded said magnetic flux threshold, cause the torque of the electric motor to start increasing.

Furthermore, a second aspect of the present invention concerns a train comprising:

a plurality of traction systems, each of which comprises a respective electric motor operable by a respective electronic drive system; wherein the respective electric motor of each traction system is an asynchronous motor and the respective electronic drive system is an inverter system, or the respective electric motor of each traction system is a synchronous DC motor and the respective electronic drive system is a chopper-type system;
for each traction system, a corresponding electronic control unit coupled to said traction system and configured as the electronic control unit of the aforesaid railway vehicle; and
a central control unit connected to the electronic control units of the traction systems and configured to:
receive quantities indicative of a strain request of the train and of an available strain of each traction system,
select one or more of the traction systems, on the basis of the received quantities,
send traction commands to the electronic control units of the selected traction systems, and
send coasting commands to the electronic control units of the non-selected traction systems;
wherein each electronic control unit of each traction system is further configured to:
determine the occurrence of a coasting condition if it receives a coasting command from the central control unit; and
determine the occurrence of an exit condition from the coasting condition if it receives a traction command from the central control unit.

It is worth noting that the control logic of the various traction systems according to the aforesaid second aspect of the present invention may be advantageously exploited to control and manage also traction systems based on permanent magnet electric motors.

BRIEF DESCRIPTION OF THE DRAWINGS

For a better understanding of the present invention, some preferred embodiments thereof will be illustrated only by way of non-limitative example, and with reference to the accompanying drawings (not in scale), in which:

FIG. 2 diagrammatically shows a first control logic for controlling the operation of an inverter used for operating an asynchronous electric motor used for traction of a train according to the prior art;

FIG. 4 diagrammatically shows a second control logic for controlling the operation of an inverter used for operating an asynchronous electric motor used for traction of a train according to the prior art;

DETAILED DESCRIPTION OF PREFERRED EMBODIMENTS OF THE INVENTION

The following description is provided to allow a person skilled in the art to implement and use the invention. Various changes to the illustrated embodiments will be immediately apparent to the person skilled in the art and the generic principles may be applied to other embodiments and applications without because of this departing from the scope of protection of the present invention.

Thus, the present invention shall not be limited to the described and illustrated embodiments only, but shall be given the broadest scope of protection coherently with the principles and features presented and defined in the appended claims. With this regard, explicit reference will be made in the following description to the control and management of the operation of an inverter-type drive system used to operate an asynchronous electric motor for traction of a railway vehicle, without because of this loosing in generality, it being understood that the present invention may be used for controlling and managing the operation of a chopper-type drive system used for operating a synchronous electric DC motor (i.e., not of the permanent magnet type) used for the traction of a railway vehicle, or, more in general, for the control and management of the operation of one or more traction systems based on electric motors of any type of railway vehicle or train not of the permanent magnet type.

Furthermore, it is worth noting that a specific aspect of the present invention may be advantageously exploited to control and manage the operation of a plurality of traction systems of any type of train, which traction systems may also be based on permanent magnet electric motors.

The present invention, by virtue of an appropriate modification made to the control software for controlling an electronic drive system of an electric motor used for the traction of a railway vehicle, allows to switch off the electronic drive system when a coasting (or freewheeling) condition of the railway vehicle occurs and to switch it back on very rapidly when a traction or braking command is received.

More in particular, a first aspect of the present invention concerns a control logic for controlling the operation of an electronic drive system of an electric motor not of the permanent magnet type used for the traction of a railway vehicle, which control logic includes:

controlling the magnetic flux reduction of the motor when a coasting condition of the railway vehicle occurs to take the magnetic flux to under 20% of its nominal value; and then switching off the electronic drive system of the motor.

Such a control logic, in addition to saving energy, also allows to re-apply torque to the motor in any instant, also during flux reduction, and when the electronic drive system is off, minimizing delays in this manner.

Figure 6:
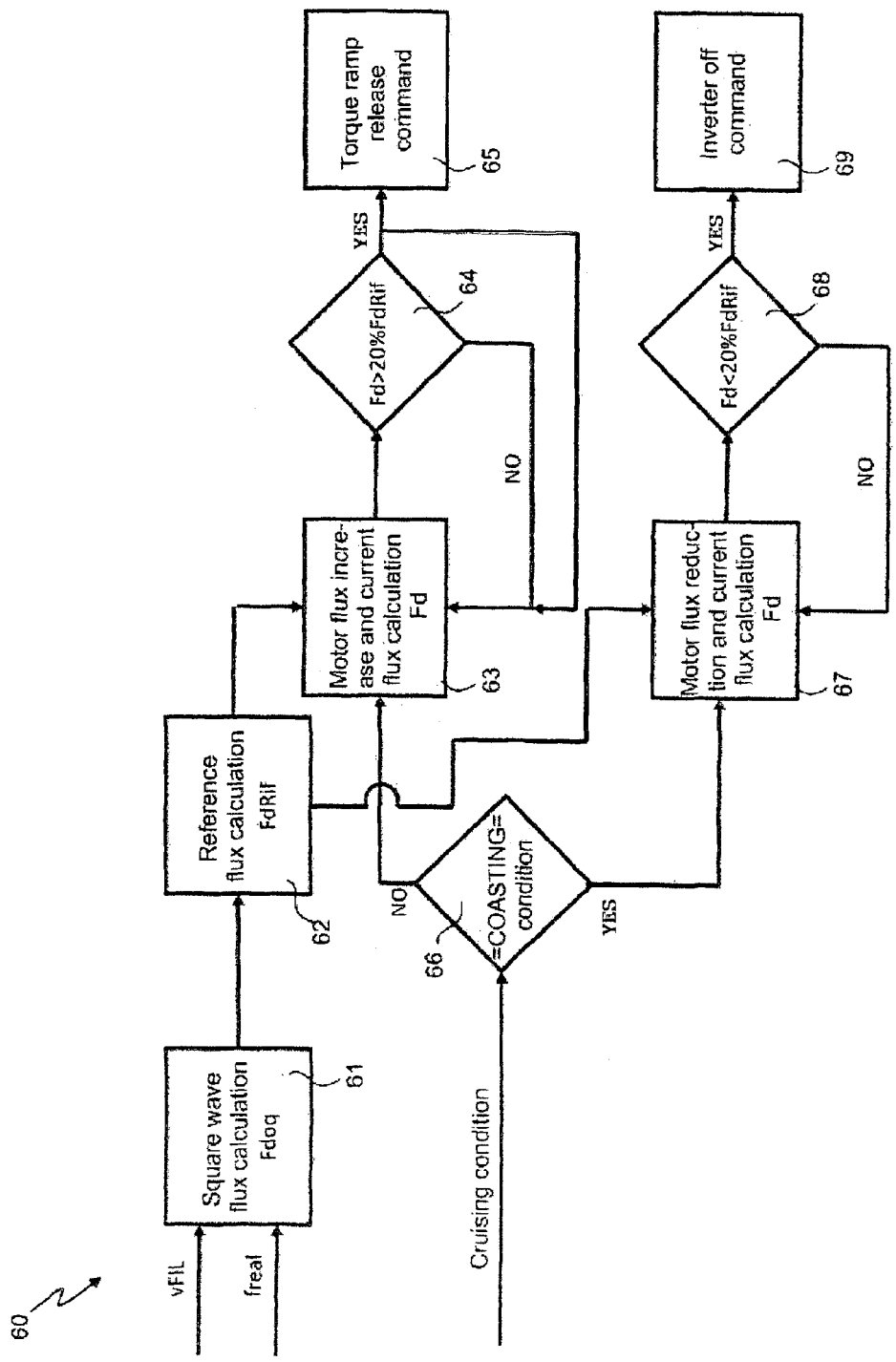
FIG. 6 diagrammatically shows a control logic for controlling the operation of an inverter used for operating an asynchronous electric motor used for traction of a train according to a preferred embodiment of the present invention.

With this regard, FIG. 6 is a flow chart showing a software control logic (indicated by reference numeral 60 as a whole) for controlling the operation of an inverter used for operating an asynchronous electric motor for the traction of a train according to a preferred embodiment of the first aspect of the present invention.

Figure 1:
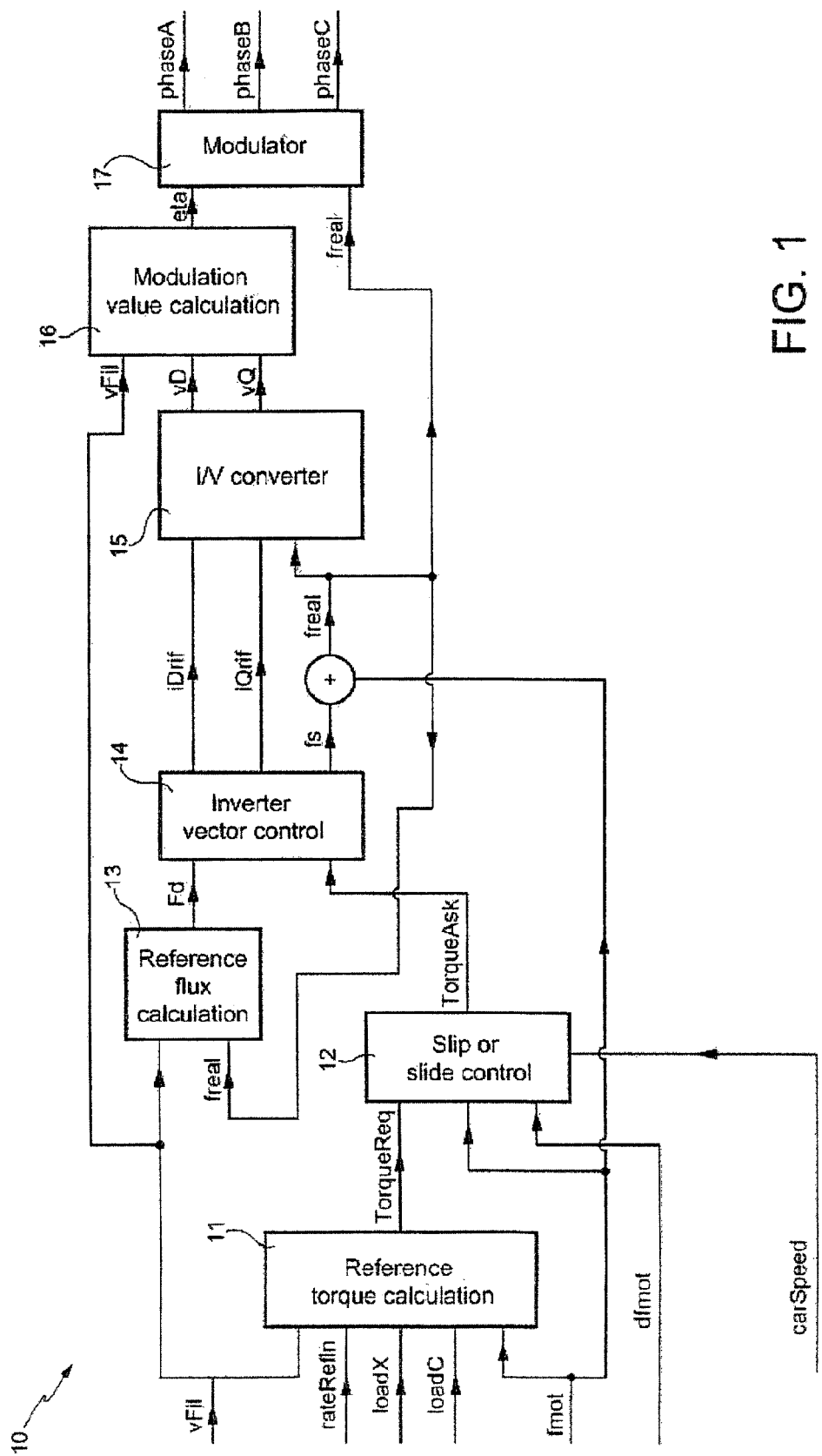
FIG. 1 diagrammatically shows a typical architecture of a unit for controlling the operation of an inverter which drives an asynchronous electric motor used for traction of a train.
Figure 3:
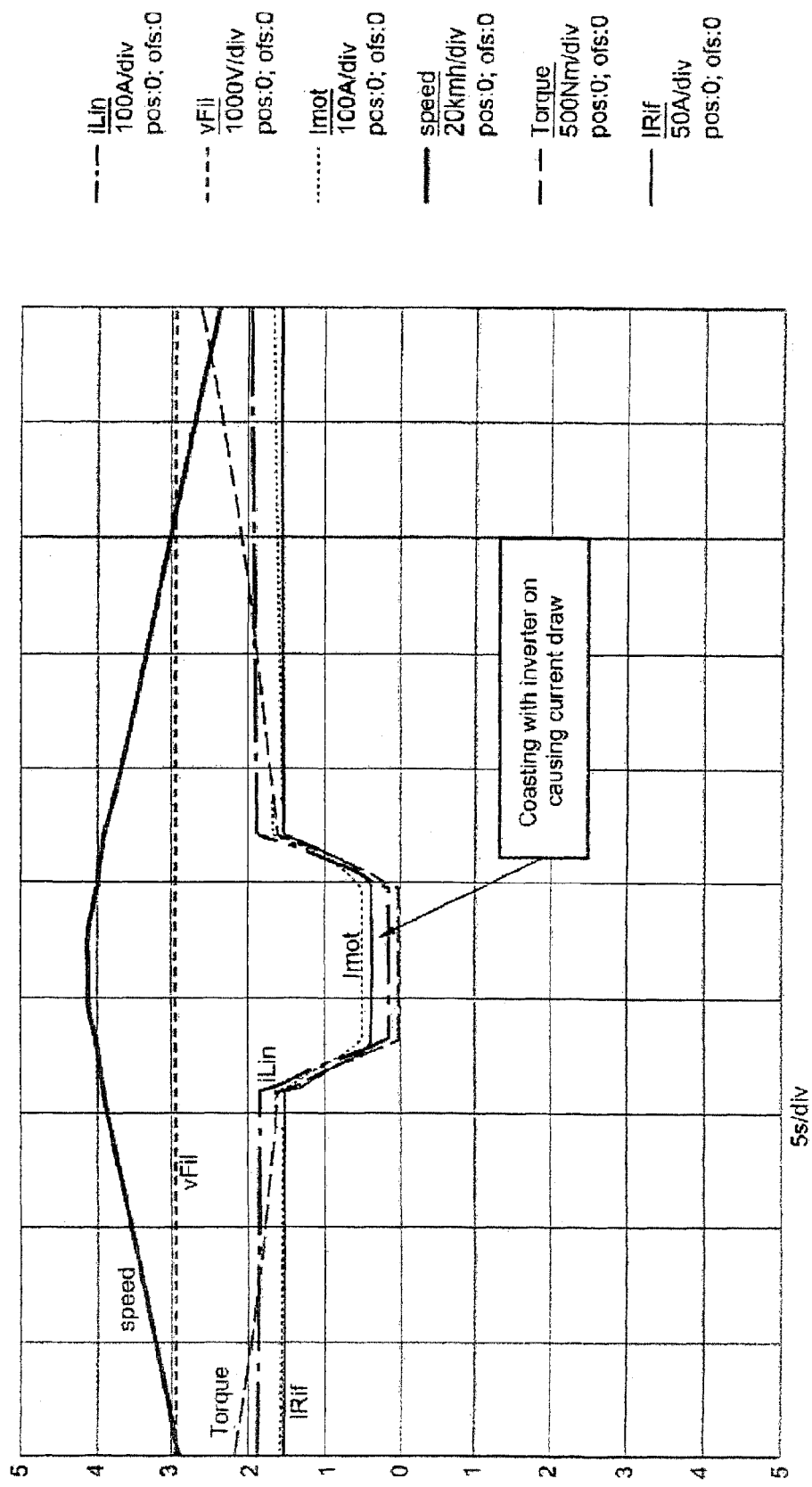
FIG. 3 shows a time chart of characteristic magnitudes of an asynchronous electric motor of a train operated by means of an inverter controlled with the logic in FIG. 2.
Figure 5:
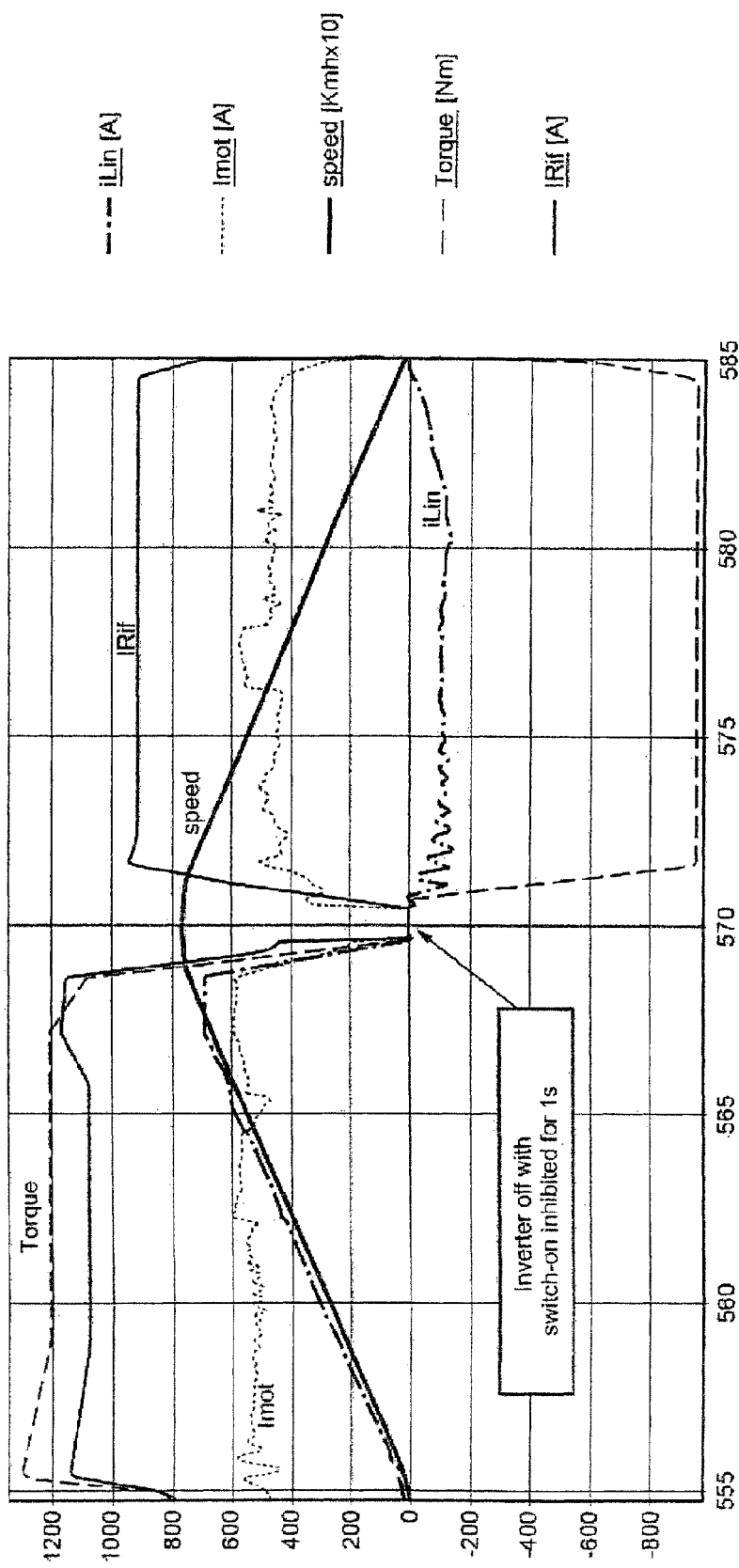
FIG. 5 shows a time chart of characteristic magnitudes of an asynchronous electric motor of a train operated by means of an inverter controlled with the logic in FIG. 4.

In particular, according to said preferred embodiment of the first aspect of the present invention, the control logic 60 is implemented by a control unit programmed by means of an appropriate software and/or firmware code. The functional architecture of such a control unit conveniently corresponds to that of the control unit 10 shown in FIG. 1 and described above, in which, however, the operation software logic of the reference flow calculating module 13 was appropriately modified.

As shown in FIG. 6, by implementing the control logic 60, the control unit in use executes all the operations of the logic 20 shown in FIG. 2 as described above (with this regard, it is worth noting that blocks 61, 62, 63, 64 and 65 of the logic 60 shown in FIG. 6 correspond to blocks 21-25 of the logic 20 shown in FIG. 2), which, therefore, will not be described again because the description provided above with this regard still applies.

Furthermore, by implementing the control logic 60, the control unit, in use, also performs the following further operations:

checking, on the basis of the received signals/data/commands indicative of a current running condition of the train, whether the train is in a coasting condition (or freewheeling) (block 66);

if it is determined that the train is not in a coasting condition, controlling the operation of the inverter so that the electric motor undergoes magnetic flux increase (i.e. so that the intensity of the magnetic flux of the electric motor increases) and at the same time calculating a current value Fd of the magnetic flux of the electric motor (block 63);

if, instead, it is determined that the train is in a coasting condition, controlling the operation of the inverter so that the electric motor undergoes magnetic flux reduction (i.e. so that the intensity of the magnetic flux of the electric motor decreases) and calculating a current value Fd of the magnetic flux of the electric motor at the same time (block 67);

checking whether the current magnetic flux value Fd is lower than 20% of the reference target value FdRif (block 68);

if it is determined that the current value Fd of the magnetic flux is lower than 20% of the reference target value FdRif, generating an inverter switching off command (block 69); and, if, instead, it is determined that the current value Fd of the magnetic flux is not lower than 20% of the reference target value FdRif, continuing to control the operation of the inverter so that that the electric motor continues to undergo magnetic flux reduction and continuing to calculate the current value Fd of the magnetic flux of the electric motor at the same time (block 67).

In other words, the control logic 60 includes setting the reference current to zero in the instant in which strain is zero. During this step, named flux reduction, the reference current follows an exponential-type law and when the value reaches 20% of the nominal value is set to zero. The inverter is switched off completely from this moment.

Once the inverter is off, the control unit switches the inverter back on when it receives a traction or braking command and the motor flux increase step starts. The strain ramp starts to nominal value when the flux reaches 20% of the nominal flux (i.e. after approximately 100 ms).

The strain ramp will start immediately without any delay if the command is received from the control unit before the inverter is completely off.

In other words, the control logic 60 includes controlling the motor current during flux reduction to 20% of the nominal flux so that torque can be reapplied instantly if requested. Without using the control logic 60 it would not be possible to apply torque instantaneously because the position of the rotor flux is not known, and this condition could cause an overcurrent with corresponding inverter switch-off until the protection is reset by the train driver and/or the train logic.

Therefore, the changes made according to the first aspect of the present invention to the reference flux calculating module allow, during the phase of coasting, to hook the inverter current immediately after switch-off.

According to the description above, the control logic 60, in addition to saving energy, allows also to reapply motor torque in any instant, both during flux reduction and with the inverter off, minimizing in this manner the delays which in the past did not allow to apply the coasting technique with the inverter off to tram and underground train vehicles. Therefore, the control logic 60 allows to apply the coasting technique with the inverter off also to tram and underground train vehicles.

The applicant has estimated that, by virtue of the use of the control logic 60 which allows to switch the inverter off during coasting, it is possible to obtain a reduction of the global energy drawn at the pantograph equal to 5% for a regional transport service.

Figure 7:
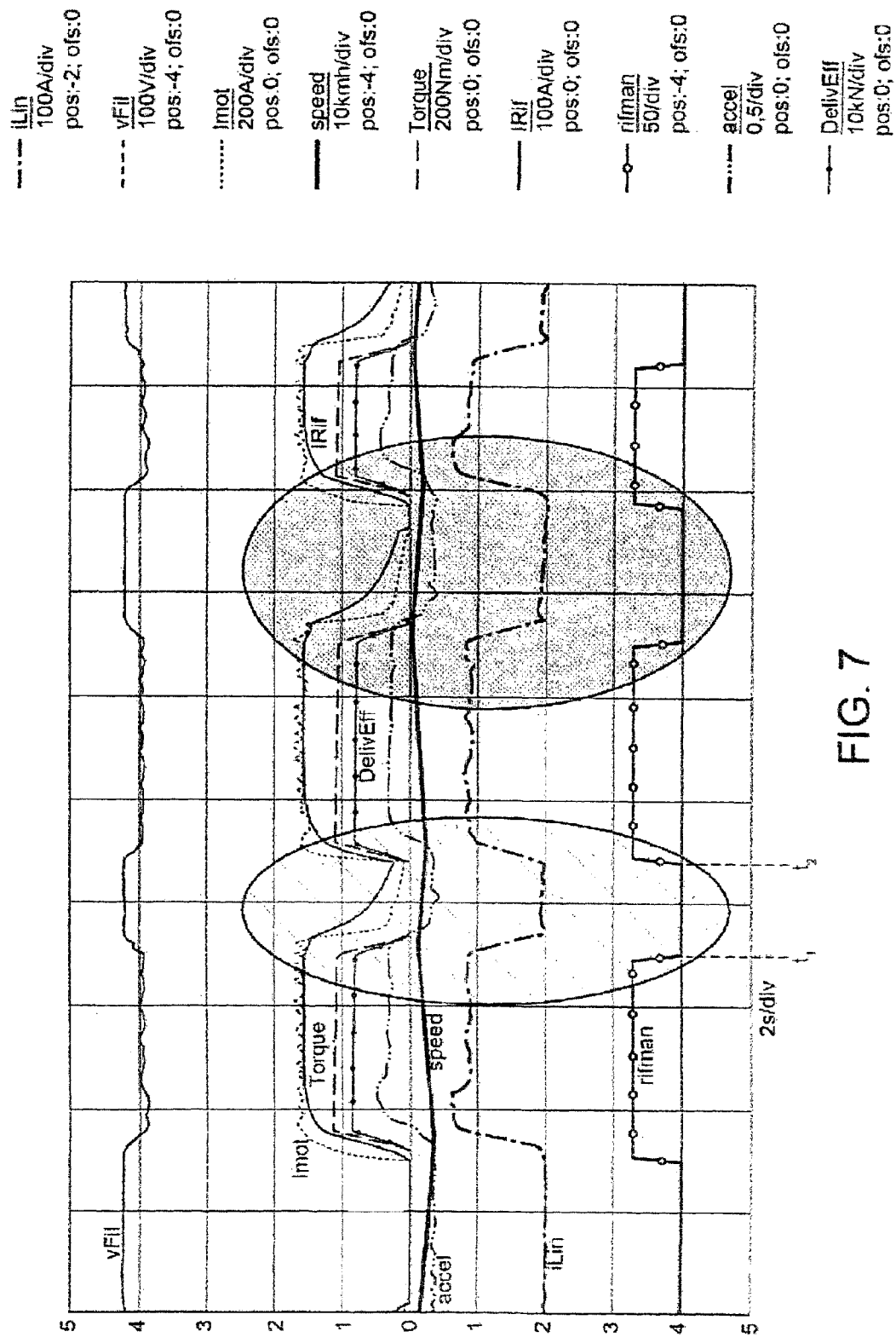
FIG. 7 shows a time chart of characteristic magnitudes of an asynchronous electric motor of a train operated by means of an inverter controlled with the logic in FIG. 6.

FIG. 7 shows a chart which was obtained by the Applicant by means of experimental tests and which shows the time trend of the characteristic magnitudes of an asynchronous electric motor of a train operated by means of an inverter controlled with the logic 60 as a coasting condition of the train occurs.

In particular, FIG. 7 shows the time trend:
of the current drawn from the line iLin;
of the filter voltage vFIL;
of the motor current Imot;
of the train speed speed;
of the train acceleration accel;
of the motor torque Torque;
of the reference current IRif;
of the strain reference rifman, which indicates the maximum strain percentage which can be achieved by the inverter; and
of the strain DelivEff calculated on the basis of the weight of the train and of the strain reference rifman.

Two regions of the chart shown in FIG. 7 are highlighted by means of two ellipsis.

In detail, with reference to the area highlighted on the left, it is worth noting that in a first instant of time $t_1$ in which a coasting signal/command is received, the motor torque Torque goes to zero and the reference current IRif start decreasing for motor flux reduction. Furthermore, when at a second time instant $t_2$ the control unit receives a traction signal/command, the reference current IRif and the motor torque Torque starts increasing immediately. In this case, the inverter is not switched off completely because the control unit receives the traction signal/command before the complete inverter switch-off.

Furthermore, with reference to the area highlighted on the right, it is worth noting that when a coasting signal/command is received, the control unit starts motor flux reduction until the magnetizing current is zero; at this point, because coasting condition persists, the inverter is switched off completely. When a traction signal/command is received, the inverter is switched on instantaneously; the motor flux increase step thus starts. When the flux reaches 20% of the nominal value, the motor torque Torque starts increasing to the reference value.

Figure 8:
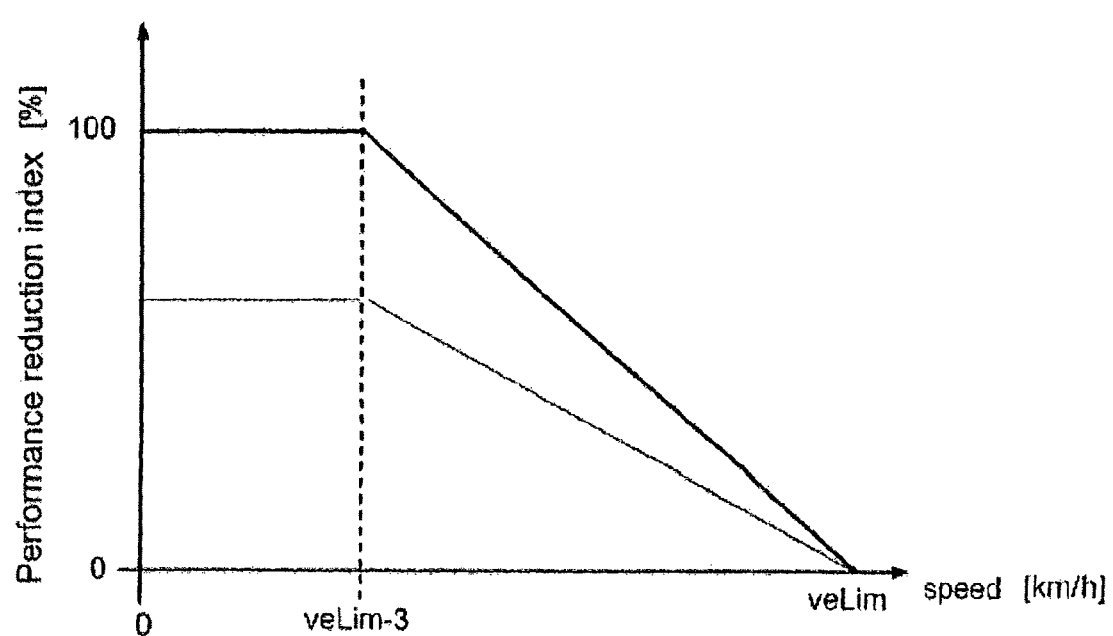
FIG. 8 shows the trend of an index of reduction of the performances as a function of the train speed.

The innovative railway coasting management logic described above may be advantageously extended also to railway train level considering the onboard limit speed management. Indeed, in a distributed traction train, each control unit of the operation of an electronic drive system of an electronic traction motor generally receives the traction and braking commands, the strain reference and the speed limit from the railway vehicle running control system. Thus, each control unit of the operation of an electronic drive system which operates for traction adjusts the strain applied in traction also as a function of the speed limit. Typically, when the train speed is higher than the limit speed minus 3 km/h, the control unit reduces the strain in percentage steps to zero at the limit speed and for higher speeds, as shown in the chart in FIG. 8 in which veLim indicates the speed limit and the performance reduction index represents the strain percentage applied with respect to the requested.

Currently, in order to maintain the limit speed, all the electronic drive systems are left on even if the total required strain of the vehicle is lower than that available for a single electronic drive system.

Therefore, a second aspect of the present invention stems from the Applicant's idea to exploit the innovative quick switch-on logic of the electronic drive system described above also to manage the strain request of the vehicle during train cruising to keep on only the electronic drive systems which are really needed. With this regard, it is worth noting that the algorithm is applicable for traction, while it cannot be used for braking in order not to impact on the combined pneumatic or hydraulic brake management systems.

In particular, said second aspect of the present invention concerns a control system for controlling the operation of electronic drive systems of electric motors used for train traction, which system comprises:
for each electronic drive system, a corresponding control unit designed to operate as described above in relation to the management of a coasting condition according to the first aspect of the present invention; and
a central control unit for controlling the operation of the train which is connected to all the aforesaid control units of the electronic drive systems and is configured to:
select one or more drive systems to be operated according to the quantities indicative of a strain request calculated as the product of the current weight of the train with respect to the maximum weight by the strain percentage reference by the maximum strain of the train and an available strain of each drive system, which considers the maximum torque and maximum power limitations set by the electronic drive system in order to guarantee respect of the thermal performance without making protections trip,
send coasting commands to the control units of the non-selected drive systems, and
send traction commands to the electronic control units of the selected drive systems.

In order words, in use the control unit calculates the number of electronic drive systems to be switched on according to the strain request and the available strain for each of the electronic drive systems. For example, on a train with four electronic drive systems, if a strain lower than 25% is required, the central control unit requires the switching on of only one electronic drive system, from 25% to 50% of two electronic drive systems and so on to four electronic drive systems on when the required strain is from 75% to 100%.

Furthermore, according to said second aspect of the present invention, the control unit of each electronic drive system is also configured to:

determine the occurrence of a coasting condition if it receives a coasting command from the central control unit; and determine the occurrence of an exit condition from the coasting condition if it receives a traction command from the central control unit.

Therefore, in this manner, the control unit of each electronic drive system causes a flux reduction of the respective electronic motor when it receives a coasting command of the central control unit and switches off the respective electronic drive system when the magnetic flux decreases under the 20% of the flux reference value.

Furthermore, the control unit of each electronic drive system performs one of the following operations (previously described above) when a traction command is received from the central control unit:

if the respective electronic drive system is on, generating a command to increase the drive torque of the respective electric motor;

if the respective electronic drive system is off, causing a flux increase of the respective electric motor and, when the magnetic flux value exceeds 20% of the flux reference value, generating a command to increase the drive torque of the respective electric motor.

This solution, currently not implemented on any railway vehicle, allows to reduce the power drawn at the pantograph by 3% (data obtained by the Applicant by means of simulations carried out on an underground-type vehicle).

Such an energy saving is obtained by virtue of the massive switch-off of non-required electronic drive systems, switch-off which allows to reduce drastically traction converter losses.

The central control unit may further control the cyclic switch-on of the electronic drive systems, reducing in this manner the line thermal current drawn by each electronic drive system thus obtaining:

a reduction of the required cooling power, which additionally allows to use smaller cooling systems; and an increase of the average mean time between failures (MTBF) of the electronic drive systems by virtue of a reduction of the hours of operation (the hours of service of the railway vehicle being equal).

It is worth noting here that the control system according to said second aspect of the present invention may be advantageously exploited to control and manage the operation of a plurality of traction systems of any type of train, which traction systems may also be based on permanent magnet electric motors.

The advantages of the invention can be readily understood from the description above.

In particular, it is worth noting once again that the fact that this invention allows to reduce the energy consumption of railway vehicles provided with electric traction systems by eliminating magnetizing current losses in the electronic drive systems of the electric motors and in the motors themselves during the phases of coasting of such vehicles.

In detail, the present invention allows to obtain the following technical advantages:

an increase of the operative efficiency of the electric traction system of the railway vehicles;

a reduction of energy consumptions, for example, a reduction of energy drawn at the pantograph by the railway vehicles (e.g. trains, underground trains, trams etc.);

a reduction of acoustic pollution.

Furthermore, the present invention, by implementing an optimized management of the devices already existing on vehicle and the energy fluxes between them by means of the use of innovative control software techniques as described above, allows to obtain better performances without requiring changes to the vehicles, and thus without additional costs or developing times deriving from the introduction of new hardware technologies.

It is worth emphasizing once again the fact that the first aspect of the present invention may be advantageously exploited to control and manage the operation of:

inverter-type drive systems used for operating asynchronous electric motors; and chopper-type drive systems used for operating synchronous electric DC motors.

With this regard, it is worth mentioning that the use of the first aspect of the present invention is not particularly advantageous in case of permanent magnet synchronous motors because such electric motors already intrinsically implement an automatic magnetic flux control.

On the contrary, the use of the second aspect of the present invention is particularly advantageous also in the case of permanent magnet electric motors.

Furthermore, the present invention may be advantageously exploited to control and manage the operation of electronic drive systems of the electric motors used for the traction of railway vehicles of any type, such as mass-transit trains, electric multiple unit (EMU) trains, heavy traction trains, high speed trains, long distance trains, underground trains, regional trains, trams with or without driver, etc.

Finally, it is apparent that many changes can be made to the present invention all included within the scope of protection defined by the appended claims.

The invention claimed is:

1. A train comprising a plurality of railway vehicles, each of which comprises:

a respective traction system, which includes a respective electric motor operable by a respective electronic drive system; wherein the respective electric motor of each traction system is an asynchronous motor and the respective electronic drive system is an inverter system, or the respective electric motor of each traction system is a synchronous DC motor and the respective electronic drive system is a chopper-type system;

a respective electronic control unit coupled to the respective traction system;

wherein the train comprises a central control unit connected to the electronic control units of the railway vehicles, and being configured to:

receive quantities indicative of a strain request for the train and of an available strain for each traction system;

select one or more traction system on the basis of the received quantities;

send traction commands to the respective electronic control units of the selected traction systems; and send coasting commands to the respective electronic control units of the non-selected traction systems;

wherein, for each railway vehicle, the respective electronic control unit is configured to:

determine an occurrence of a coasting condition when the electronic control unit receives a coasting command from the central control unit;

when the electronic control unit determines the occurrence of the coasting condition, control an operation of the respective electronic drive system so as to cause the respective electric motor to undergo a magnetic flux reduction and, during the magnetic flux reduction of the respective electric motor, said controlling the operation comprises:
monitoring the magnetic flux of the respective electric motor,
determining whether the magnetic flux of the respective electric motor decreases under a magnetic flux threshold, and
when the electronic control unit detects that the magnetic flux of the respective electric motor has decreased under the magnetic flux threshold, switch off the respective electronic drive system, and
determine an occurrence of an exit condition from the coasting condition when the electric control unit receives a traction command from the central control unit;
when the electronic control unit determines the occurrence of the exit condition, determine whether the respective electronic drive system is on or off, wherein the electronic control unit is configured to determine that the respective electronic drive system is;
  on when the magnetic flux of the respective electric motor exceeds the magnetic flux threshold, or
  off when the magnetic flux of the respective electric motor is lower than the magnetic flux threshold;
when the electronic control unit determines the occurrence of the exit condition and the electronic control unit also determines the respective electronic drive system is on, cause a torque of the respective electric motor to start increasing;
when the electronic control unit determines the occurrence of the exit condition and the electronic control unit also determines the respective electronic drive system is off, switch on the respective electronic drive system, control the operation of the respective electronic drive system so that the respective electric motor undergoes a magnetic flux increase, and, during said magnetic flux increase of the respective electric motor;
  monitor the magnetic flux of the respective electric motor,
  determine whether the magnetic flux of the respective electric motor exceeds said magnetic flux threshold, and
  when the electronic control unit determines that the magnetic flux of the respective electric motor has exceeded the magnetic flux threshold, cause the torque of the respective electric motor to start increasing.

2. The train of claim 1, wherein, for each railway vehicle, the respective
electronic control unit is further configured to:
calculate a square wave magnetic flux value (Fdoq) on a basis of magnitudes indicative of a supply voltage (vFIL) of the traction system and of a supply frequency (freal) of the electric motor;
calculate a magnetic flux reference target value (FdRif) on a basis of a square wave magnetic flux value (Fdoq) and of a predetermined magnetic flux nominal value (Fd-Nom); and
calculate the magnetic flux threshold on the basis of the magnetic flux reference target value (FdRif).

3. The train of claim 1, wherein:
each respective electronic control unit of each railway vehicle is a first electronic control unit that includes software code portions configured to be executed thereby;
wherein the train includes a second electronic control unit connected to the first electronic control units;
wherein said software code portions comprise:
  first portions, which are designed to be executed by each of the first electronic control units and are such that to cause, when executed, each first electronic control unit to become configured as the electronic control units of the railway vehicles of the train; and
  second software portions, which are designed to be executed by the second electronic control unit and are such that to cause, when executed, said second electronic control unit to become configured as the central control unit of the train.

* * * * *